April 21, 1925.
C. W. BELDEN ET AL
1,534,567
DRAWING AND FLATTENING SHEET GLASS
Filed Sept. 5, 1922          2 Sheets-Sheet 1
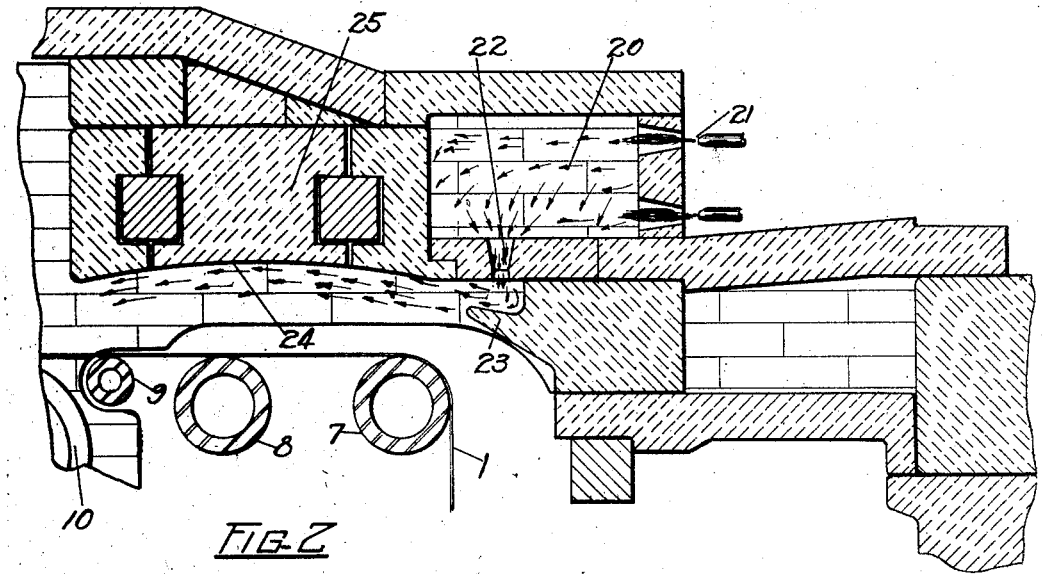
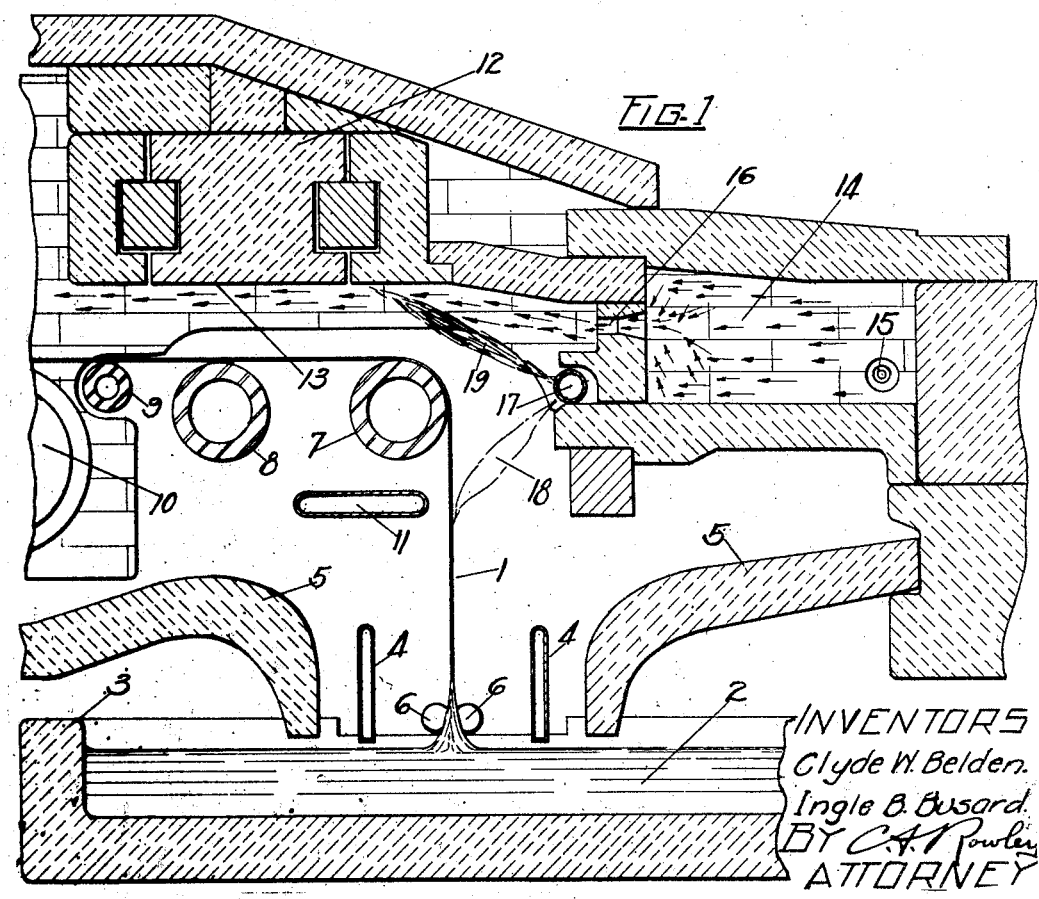

April 21, 1925. 1,534,567
C. W. BELDEN ET AL
DRAWING AND FLATTENING SHEET GLASS
Filed Sept. 5, 1922 2 Sheets-Sheet 2

INVENTORS
Clyde W. Belden.
Ingle B. Busard.
BY C. A. Rowley
ATTORNEY

Patented Apr. 21, 1925.

1,534,567

UNITED STATES PATENT OFFICE.

CLYDE W. BELDEN, OF SHREVEPORT, LOUISIANA, AND INGLE B. BUSARD, OF CHARLESTON, WEST VIRGINIA, ASSIGNORS TO THE LIBBEY-OWENS SHEET GLASS COMPANY, OF TOLEDO, OHIO, A CORPORATION OF OHIO.

DRAWING AND FLATTENING SHEET GLASS.

Application filed September 5, 1922. Serial No. 586,135.

*To all whom it may concern:*

Be it known that we, CLYDE W. BELDEN and INGLE B. BUSARD, citizens of the United States, residing, respectively, at Shreveport, in the parish of Caddo and State of Louisiana, and Charleston, in the county of Kanawha and State of West Virginia, have invented new and useful Improvements in Drawing and Flattening Sheet Glass, of which the following is a specification.

This invention relates to the art of drawing sheet glass, and more particularly to an improved method and apparatus for reheating the drawn sheet in preparation for the flattening operation.

The object is to provide an apparatus in which the drawn sheet is reheated indirectly, by radiation from a member past which the sheet is slowly drawn in its passage from the molten source to the flattening means. It has been found that when heating flames are applied directly to the sheet, their effect across the width of the sheet is not always entirely even and continuous. A series of closely adjacent flames must be used, which only approximates a continuous sheet of flame, and varying pressure in the gas burners cause these flames to vary somewhat in intensity and direction. This all results in somewhat different degrees of heat being applied to different areas of the sheet, which is undesirable and not conducive to a perfect flattening of the sheet. By the present invention the heating flames are not applied directly to the sheet but are directed against an approximately continuous surface of radiating material positioned adjacent the path of the moving sheet so that this surface becomes quite evenly heated. The sheet is heated by radiation from this hot surface, which imparts a steady even glow, heating equally and constantly all parts of the sheet passing thereby.

Several different forms of apparatus for carrying out the principles of this invention are disclosed in the accompanying drawings, and the objects and advantages of the invention will become more apparent from the following detailed description of these different modifications.

In the accompanying drawings:

Fig. 1 shows a vertical section through one form of mechanism wherein the heat is applied to the roof structure directly overhanging the first horizontal run of the sheet.

Fig. 2 shows a similar structure involving a different arrangement of the fire-box.

Figure 3:
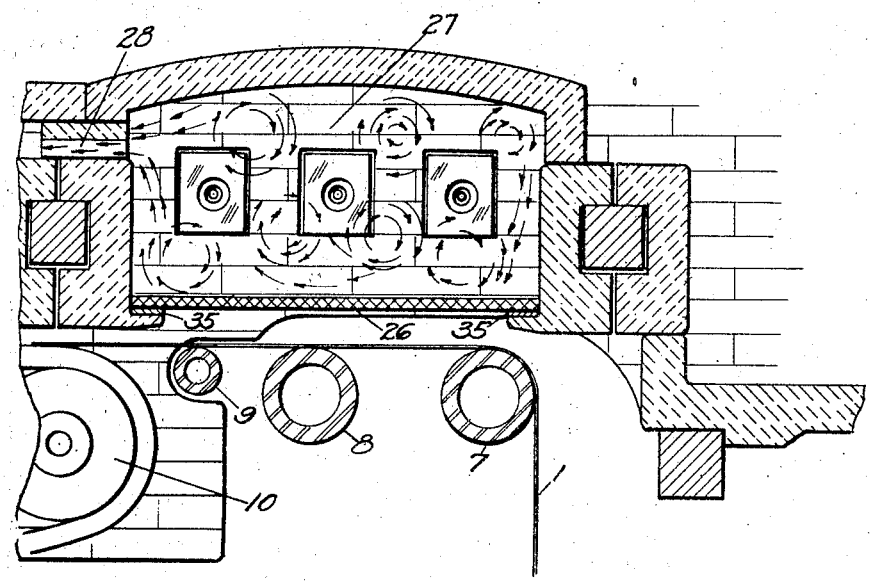
Figs. 3 and 4 show two different forms of apparatus wherein the heat is applied to the upper side of the radiating member and transmitted therethrough to the sheet.

Although this invention, with perhaps some slight rearrangement of parts, might be applied to any sheet drawing system, it is here shown, and is particularly adapted for use with the Colburn system of drawing sheet glass, which is substantially set forth in the patent to I. W. Colburn, 1,248,809, granted Dec. 4, 1917. In this system the sheet of glass 1, is drawn up from the molten bath of glass 2 in receptacle 3, between coolers 4 for tempering the molten glass at the sheet source, and liptiles 5 which cover the larger part of the molten glass in receptacle 3. Edge-forming rollers 6 are used to retain the width of the sheet. Sheet 1 is drawn up, and then bent into the horizontal plane over the cooled bending roller 7, passing therefrom over supporting rollers 8 and 9, into the drawing and flattening mechanism indicated at 10. A cooler 11 beneath the bending roller 7 serves to cool the roller surface and the under face of the sheet to prevent sticking of these parts during the bending process. All of the above is old in the Colburn process as referred to in the patent noted above.

The sheet 1 is still somewhat plastic at the time it is bent around the roll 7, but it has cooled and set to such an extent that it is apt to retain in some degree the curvature imparted by the roller, and the sheet will be more or less corrugated. To prevent this, and to remove any other curves or warpage in the sheet, the sheet is reheated after leaving the bending roll 7, and the corrugations will be partially stretched out during the passage from roll 7 to the drawing mechanism, and will be entirely removed when the sheet is allowed to settle and flatten on the flattening table 10. It is essential that this reheating be applied evenly and steadily to all portions of the sheet to secure the best results in the flattening process. It has been the practice in the past to direct heating flames, or heated gases, directly against the sheet surface, but it is difficult to obtain an even sheet of flame of equal intensity across the entire glass sheet, also the gas pressure is not always steady, allowing the flames to vary somewhat in direction and intensity.

Referring now more particularly to Fig. 1, it will be noted that the roof or cover member 12 above the first part of the horizontal run of the sheet is formed with a practically flat and continuous lower surface 13, positioned rather close to, and substantially parallel with, the sheet 1. This roof or member 12 is formed of suitable tiles or other material adapted to take and retain a considerable amount of heat, and act as a good radiating agent. At 14 is a fire-box heated by burners such as 15, the heated gases passing out through ports 16, and being directed against and along the surface 13. Some of the heat is reflected by this surface against the sheet 1 passing therebeneath. Also the roof members 12 become highly heated, and radiate an even intense heat against the sheet.

At 17 is shown a pipe-burner, comprising a gas-pipe positioned transverse to and parallel with the sheet surface, and having a series of burner openings or perforations to form a sheet of flame across the width of the sheet. When the drawing of the continuous sheet is first started, it is desirable to heat the sheet somewhat to facilitate the bending process, and at this time the pipe-burner 17, which may be partially rotated, is turned down so as to direct the flames against the vertical run of the sheet, as indicated in dotted lines at 18. After the sheet is successfully started, the burner 17 is turned up so as to direct its flames against the cover member 12, as shown at 19. In this position it assists the fire-box 14 in heating the radiating surface 13.

In Fig. 2 is shown a quite similar construction, the fire-box 20 in this form being arranged closer to and above the sheet. This fire-box is heated by burners 21, the heated gases being directed down through ports 22, where they are deflected by the tile 23 against the surface 24 of cover members 25. In this form the surface 24 has been somewhat curved or concaved so that the heat will be concentrated on a more localized area of the sheet. Of course the pipe-burner 17 (Fig. 1) could be used with this form of the apparatus, and also with those subsequently to be described, if so desired.

In Fig. 3, the roof or radiating surface above the sheet is composed of a thin plate or plates 26 of carborundum or other heat transmitting material. Above these plates is a fire-box 27, having an exit flue at 28. The heat is transmitted or radiated through plates 26 in a steady even manner to the glass sheet 1 as it passes thereunder.

Figure 4:
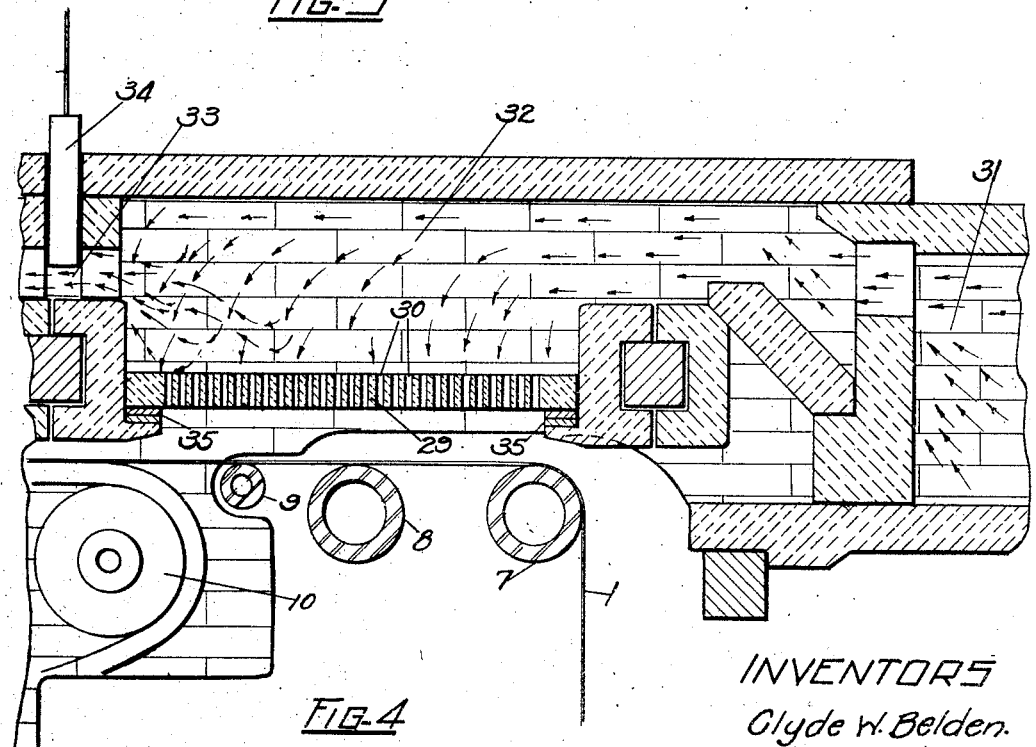

In Fig. 4 the radiating surface is formed of a tile 29 whose whole body is honeycombed with a series of fine perforations 30. Heated gases from the fire-box 31 pass through chamber 32 over this plate or tile 29, some of the heated gases passing through the perforations 30, and some through the exit flue 33, controlled by gate 34. The heat seeping through the perforations 30 will raise plate 29 to a red glow of heat so that it radiates a steady even heat on the sheet 1 passing therebeneath. It is better to have the fire-box 31 to one side of, rather than directly over the plate 30, since the combustion will take place in the chamber 31, and there will be less tendency for carbon or other deposits to form above the plate 29 and clog the perforations 30. By adjusting the flue or gate 34, the proportion of the gases forced to pass through the plate 29 may be varied as desired. Either the plate 26 of Fig. 3, or the plate 29 of Fig. 4 may be adjusted vertically to vary its distance from, and radiating effect upon, the sheet by any suitable means, here shown as removable supporting shims 35.

Claims:

1. In the process of producing sheet glass, wherein the sheet is drawn upwardly from a molten bath of glass, bent into the horizontal plane, and then passed through a flattening mechanism, the method of reheating the sheet in its horizontal run in preparation for the flattening operation by applying heat to a substantially horizontal surface under which the sheet passes, the sheet being indirectly heated by heat transmitted from said surface.

2. In a sheet glass drawing apparatus, wherein the sheet is drawn vertically from a bath of molten glass and then bent into the horizontal plane, means for reheating the sheet in its horizontal run, comprising a member of heat radiating material having a substantially horizontal lower surface under which the sheet moves, and a source of heat which plays on the member and not on the sheet, the sheet being heated by radiation from the member.

3. In a sheet glass drawing apparatus, wherein the sheet is drawn vertically from a bath of molten glass and then bent into the horizontal plane, means for reheating the sheet in its horizontal run, comprising a member of heat radiating material under which the sheet moves, a source of heat for heating this member, and an auxiliary heating means adapted to interchangeably play against either the vertical run of the sheet or the radiating member.

4. In a sheet glass drawing apparatus, wherein the sheet is drawn vertically from a bath of molten glass and then bent into the horizontal plane, means for reheating the sheet in its horizontal run, comprising a member of heat radiating material under which the sheet moves, a source of heat for heating this member, and a pipe-burner adapted to play its flame interchangeably against either the vertical run of the sheet or the radiating member.

5. In a sheet glass drawing apparatus, wherein the sheet is drawn vertically from a bath of molten glass and then bent into the horizontal plane, means for reheating the sheet comprising a member of heat radiating material under which the sheet moves in its horizontal run, and a heating means adapted to interchangeably play against either the vertical run of the sheet or the radiating member.

6. In a sheet glass drawing apparatus, wherein the sheet is drawn vertically from a bath of molten glass and then bent into the horizontal plane, means for reheating the sheet comprising a member of heat radiating material under which the sheet moves in its horizontal run, and a pipe burner adapted to play its flame interchangeably against either the vertical run of the sheet or the radiating member.

Signed at Shreveport, in the parish of Caddo, and State of Louisiana, this 23 day of August, 1922.

CLYDE W. BELDEN.

Signed at Toledo, in the county of Lucas, and State of Ohio, this 1st day of September, 1922.

INGLE B. BUSARD.